US011101990B2

(12) United States Patent
Stolbikov et al.

(10) Patent No.: US 11,101,990 B2
(45) Date of Patent: Aug. 24, 2021

(54) DEFAULT ACCOUNT AUTHENTICATION

(71) Applicant: Lenovo (Singapore) Pte. Ltd., Singapore (SG)

(72) Inventors: Igor Stolbikov, Apex, NC (US); Joseph Michael Pennisi, Apex, NC (US); Michael Demeter, Roswell, GA (US); Fred Allison Bower, III, Durham, NC (US); Makoto Ono, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 149 days.

(21) Appl. No.: 16/580,857

(22) Filed: Sep. 24, 2019

(65) Prior Publication Data
US 2021/0058246 A1 Feb. 25, 2021

Related U.S. Application Data
(60) Provisional application No. 62/888,989, filed on Aug. 19, 2019.

(51) Int. Cl.
  *H04L 9/08* (2006.01)
  *G06F 21/45* (2013.01)
  *H04L 9/30* (2006.01)
  *H04L 29/06* (2006.01)

(52) U.S. Cl.
  CPC ............ *H04L 9/0863* (2013.01); *G06F 21/45* (2013.01); *H04L 9/0844* (2013.01); *H04L 9/3073* (2013.01); *H04L 63/0838* (2013.01); *H04L 2463/121* (2013.01)

(58) Field of Classification Search
  CPC ... H04L 9/0863; H04L 9/0844; H04L 9/3073; H04L 63/0838; H04L 2463/121; H04L 9/3228; H04L 9/30; H04L 63/067; G06F 21/45; H04W 12/06
  See application file for complete search history.

(56) References Cited

U.S. PATENT DOCUMENTS

| | | | |
|---|---|---|---|
| 9,780,950 B1 * | 10/2017 | Dundas | H04L 9/006 |
| 10,778,435 B1 * | 9/2020 | Wimberley | H04L 9/14 |
| 2007/0130472 A1 * | 6/2007 | Buer | H04L 63/083 |
| | | | 713/182 |
| 2016/0065378 A1 * | 3/2016 | Kim | H04L 9/0866 |
| | | | 713/184 |
| 2017/0195320 A1 * | 7/2017 | Yoo | H04L 9/0861 |
| 2017/0357496 A1 * | 12/2017 | Smith | H04L 9/3228 |
| 2018/0007037 A1 * | 1/2018 | Reese | H04L 9/3297 |
| 2018/0063127 A1 * | 3/2018 | Tyagi | G06F 21/34 |
| 2019/0173874 A1 * | 6/2019 | Lovelock | H04L 63/06 |

* cited by examiner

*Primary Examiner* — Techane Gergiso
(74) *Attorney, Agent, or Firm* — Ference & Associates LLC

(57) ABSTRACT

One embodiment provides a method, including: receiving, at a remote device and from a user, a request to generate a one-time password for accessing a default account of a device, wherein the remote device comprises a device public key corresponding to the device and an account public/private key pair corresponding to the default account; generating, at the remote device, the one-time password utilizing the account private key and the device public key; and providing, from the remote device, the one-time password to the user. Other aspects are described and claimed.

20 Claims, 3 Drawing Sheets

DEFAULT ACCOUNT AUTHENTICATION

CLAIM FOR PRIORITY

This application claims priority to U.S. Provisional Patent Application Ser. No. 62/888,989, entitled "DEFAULT ACCOUNT AUTHENTICATION", filed on Aug. 19, 2019, the contents of which are incorporated by reference herein.

BACKGROUND

In order to effectuate changes on a device, a user accesses an account that allows for the changes to be made. For example, a device may include an administrator account that allows for system changes to be made. The device includes these accounts in order to reduce the chances that changes to the system are made by people accidentally or by people who should not be making these changes. Thus, devices are frequently programmed with default accounts at the time of manufacture. For example, the device may be programmed with an administrator default account, a maintenance default account, and the like. These default accounts require user credentials which include a default user name and a default password.

BRIEF SUMMARY

In summary, one aspect provides a method, comprising: receiving, at a remote device and from a user, a request to generate a one-time password for accessing a default account of a device, wherein the remote device comprises a device public key corresponding to the device and an account public/private key pair corresponding to the default account; generating, at the remote device, the one-time password utilizing the account private key and the device public key; and providing, from the remote device, the one-time password to the user.

Another aspect provides an information handling device, comprising: a processor; a memory device that stores instructions executable by the processor to: receive, at a remote device and from a user, a request to generate a one-time password for accessing a default account of a device, wherein the remote device comprises a device public key corresponding to the device and an account public/private key pair corresponding to the default account; generate, at the remote device, the one-time password utilizing the account private key and the device public key; and provide, from the remote device, the one-time password to the user.

A further aspect provides a product, comprising: a storage device that stores code, the code being executable by a processor and comprising: code that receives, at a remote device and from a user, a request to generate a one-time password for accessing a default account of a device, wherein the remote device comprises a device public key corresponding to the device and an account public/private key pair corresponding to the default account; code that generates, at the remote device, the one-time password utilizing the account private key and the device public key; and code that provides, from the remote device, the one-time password to the user.

In summary, one aspect provides a method, comprising: receiving, at a device and from a user, a request to access a default account of the device; receiving, at the device, a one-time password from the user, wherein the one-time password was generated at a remote device utilizing an account private key corresponding to the default account and a device public key corresponding to the device, both the account private key and the device public key being stored on the remote device; and authenticating, at the device, the one-time password, wherein the authenticating comprises generating a device one-time password utilizing a device private key corresponding to the device and an account public key corresponding to the default account, both the device private key and the account public key being stored on the device.

Another aspect provides an information handling device, comprising: a processor; a memory device that stores instructions executable by the processor to: receive, at a device and from a user, a request to access a default account of the device; receive, at the device, a one-time password from the user, wherein the one-time password was generated at a remote device utilizing an account private key corresponding to the default account and a device public key corresponding to the device, both the account private key and the device public key being stored on the remote device; and authenticate, at the device, the one-time password, wherein the authenticating comprises generating a device one-time password utilizing a device private key corresponding to the device and an account public key corresponding to the default account, both the device private key and the account public key being stored on the device.

A further aspect provides a product, comprising: a storage device that stores code, the code being executable by a processor and comprising: code that receives, at a device and from a user, a request to access a default account of the device; code that receives, at the device, a one-time password from the user, wherein the one-time password was generated at a remote device utilizing an account private key corresponding to the default account and a device public key corresponding to the device, both the account private key and the device public key being stored on the remote device; and code that authenticates, at the device, the one-time password, wherein the authenticating comprises generating a device one-time password utilizing a device private key corresponding to the device and an account public key corresponding to the default account, both the device private key and the account public key being stored on the device.

In one embodiment receiving a request at the remote device comprises receiving user credentials associated with the remote device and authenticating the user at the remote device.

In one embodiment generating a one-time password utilizes a timestamp or a counter.

In one embodiment the remote device stores device public keys for a plurality of devices.

In one embodiment receiving a request at the remote device comprises receiving an identification of the device, and wherein the device public key utilized in generating the one-time password comprises a public key corresponding to the identified device.

In one embodiment receiving a request at the remote device comprises receiving an identification of the default account; and wherein the account private key utilized in generating the one-time password comprises a private key corresponding to the identified default account.

In one embodiment each of the device public/private key pair and the account public/private key pair comprise elliptic curve cryptography keys.

In one embodiment the device public key is exported to the remote device during manufacture of the device.

In one embodiment generating a one-time password comprises utilizing at least one one-time password algorithm selected from the group consisting of: Elliptic Curve Diffie- Hellman key agreement algorithm, time based one-time password algorithm, and hash based one-time password algorithm.

In one embodiment the one-time password is not stored on either the remote device or the device.

In one embodiment authenticating at the device comprises comparing the one-time password and the device one-time password and authorizing access to the device responsive to the one-time password and the device one-time password matching.

In one embodiment generating a device one-time password comprises utilizing a one-time password algorithm matching a one-time password algorithm utilized by the remote device to generate the one-time password.

In one embodiment generating a device one-time password utilizes a timestamp or a counter.

In one embodiment the device comprises a plurality of default accounts and each of the plurality of default accounts of the device has a corresponding account public/private key pair, the account public key being stored on the device.

In one embodiment each of: the device public key, the device private key, the account public key, and the account private key comprise elliptic curve cryptography keys.

In one embodiment the account public key is stored on the device at manufacture.

In one embodiment generating a device one-time password comprises utilizing at least one one-time password algorithm selected from the group consisting of: Elliptic Curve Diffie-Hellman key agreement algorithm, time based one-time password algorithm, and hash based one-time password algorithm.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
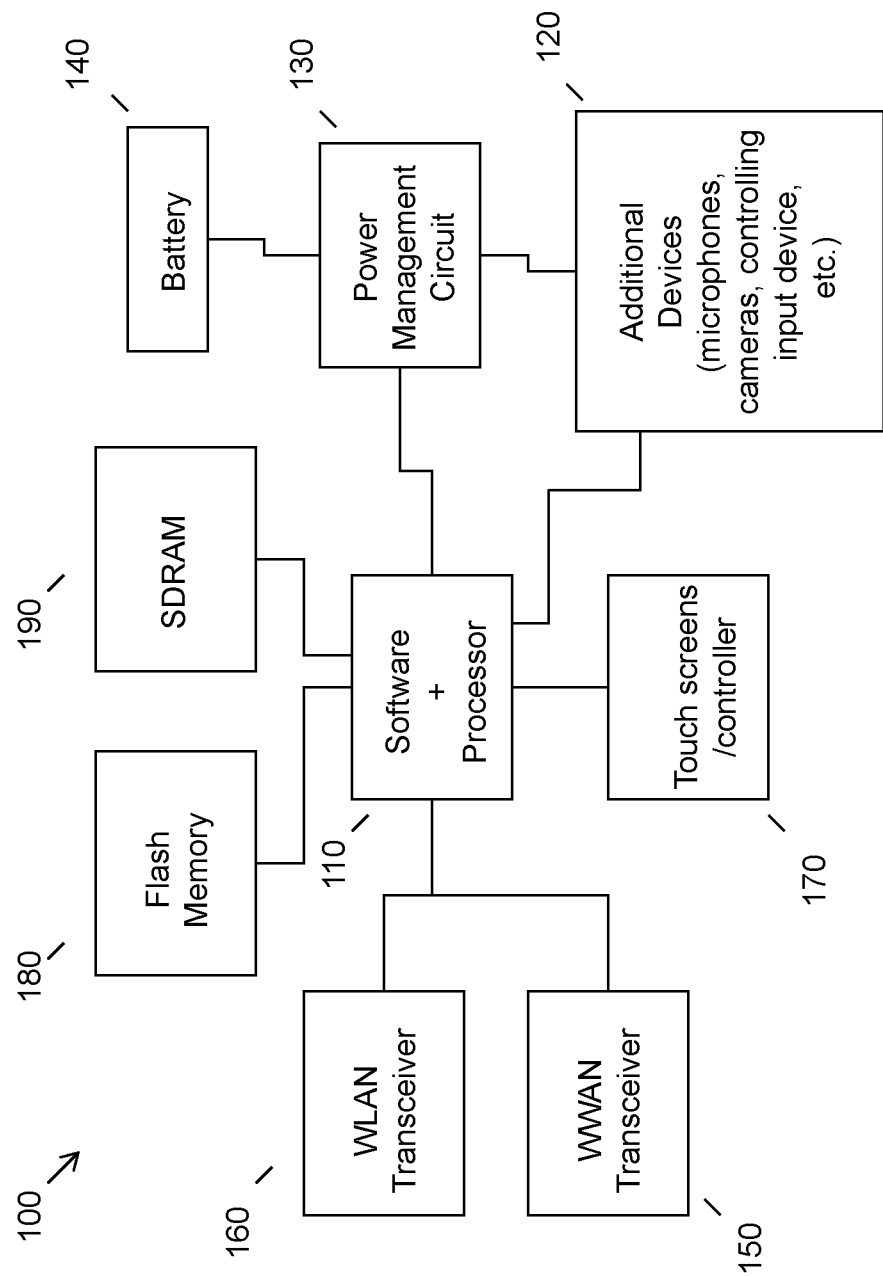
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Having default accounts, particularly those programmed on the device at the time of manufacture, require a default username and password. Traditionally, the default credentials are widely known. For example, an administrator default account may have "admin" as a default user name and "admin" as the default password. These credentials are widely known to users of devices. Additionally, since these credentials are generic credentials, they can be included in product literature such as a User's Guide, Quick Start Guide, or other documentation that is included with the device. One problem with generic default credentials for the default accounts is that, because they are generic and widely known, the default accounts are very insecure allowing anyone who knows the default credentials to access the accounts.

Thus, a solution to this problem is to create unique passwords corresponding to the device. These passwords are generally randomly generated. However, because they are unique passwords, they cannot be included in a generic product literature because each would need to be unique to the device. Accordingly, these passwords are usually printed on a label that is either attached to the device itself or may be attached to the product literature. Such a solution is more time-consuming than having generic default credentials since a unique password has to be generated for every device and that password has to be recorded in order to be conveyed to a consumer or user of the device. Additionally, since the password is recorded either on a label that is attached to the device or in literature that is provided and shipped with the device, the security of this solution is not much better than using generic credentials since anyone with physical access to the device can access the default accounts. Additionally, if the label or literature is lost, the password cannot be identified, which requires a long and tedious process of trying to change or recover the password. Such conventional solutions are particularly problematic for Internet of Things (TOT) systems and servers, for example, Edge servers, as the infiltration of these devices can cause concerns regarding the exposure of many different accounts across many different devices.

Accordingly, an embodiment provides a method for authenticating a default account of a device utilizing a one-time password generated at a remote device. When a user wants to access a default account of a device, the user accesses a remote device, for example, a cloud account, a network server, or the like. At the remote device the user provides authentication information to log into or otherwise access an account associated with the user of the remote device. Once authenticated at the remote device, the user can request a one-time password for the default account of the device. Since the remote device has previously received a public key corresponding to the device and a private key corresponding to the account, the remote device can generate a one-time password utilizing the device public key and the account private key. The one-time password can then be provided to the user.

At the default account authentication screen of the device, the user can provide the one-time password that was generated by the remote device. The device is programmed with a private key corresponding to the device and a public key corresponding to the default account. Utilizing the device private key and the account public key, the device generates its own one-time password. Since the algorithms used to generate the one-time password are the same between both the remote device and the device, the properties of the two one-time password generation algorithms will result in passwords that match across the remote device and the device. Thus, after the device generates the one-time password, the system can determine if the one-time password generated by the device matches the one-time password generated by the remote device. If the two one-time passwords do match, the system can authenticate the user and allow access to the default account of the device. If the passwords do not match, the user will be denied access to the default account.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, controlling input device such as a mouse and keyboard, dedicated gaming controller or joystick, etc. System 100 often includes one or more touch screens 170 for data input and display/rendering. System 100 also typically includes various memory devices, for example flash memory 180 and SDRAM 190.

Figure 2:
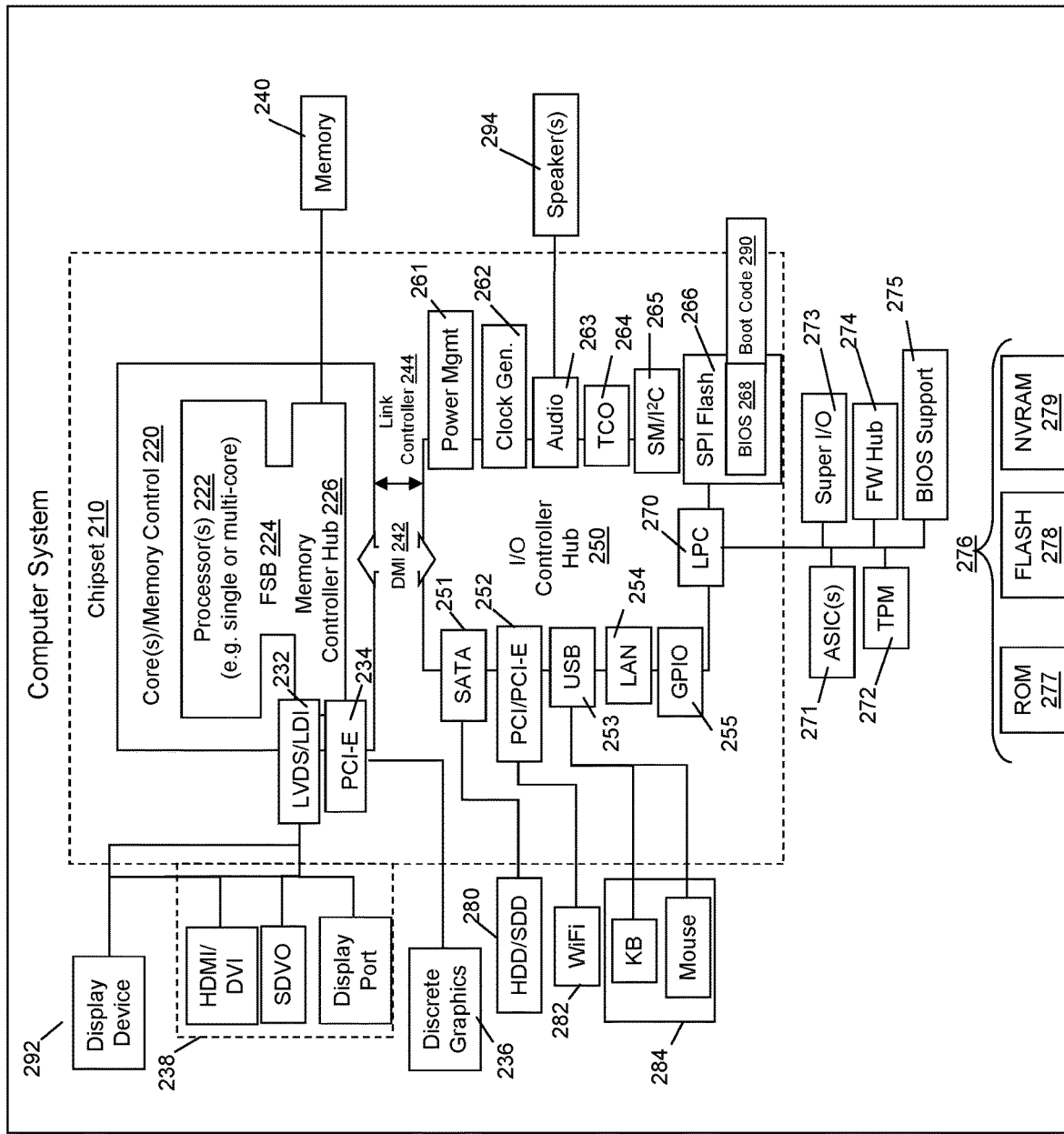
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices having default accounts. Additionally or alternatively, the circuitry may be used in remote devices that can be used to provide credentials for default accounts of other devices. For example, the circuitry outlined in FIG. 1 may be implemented in a smart phone or tablet embodiment, whereas the circuitry outlined in FIG. 2 may be implemented in a laptop or server.

Figure 3:
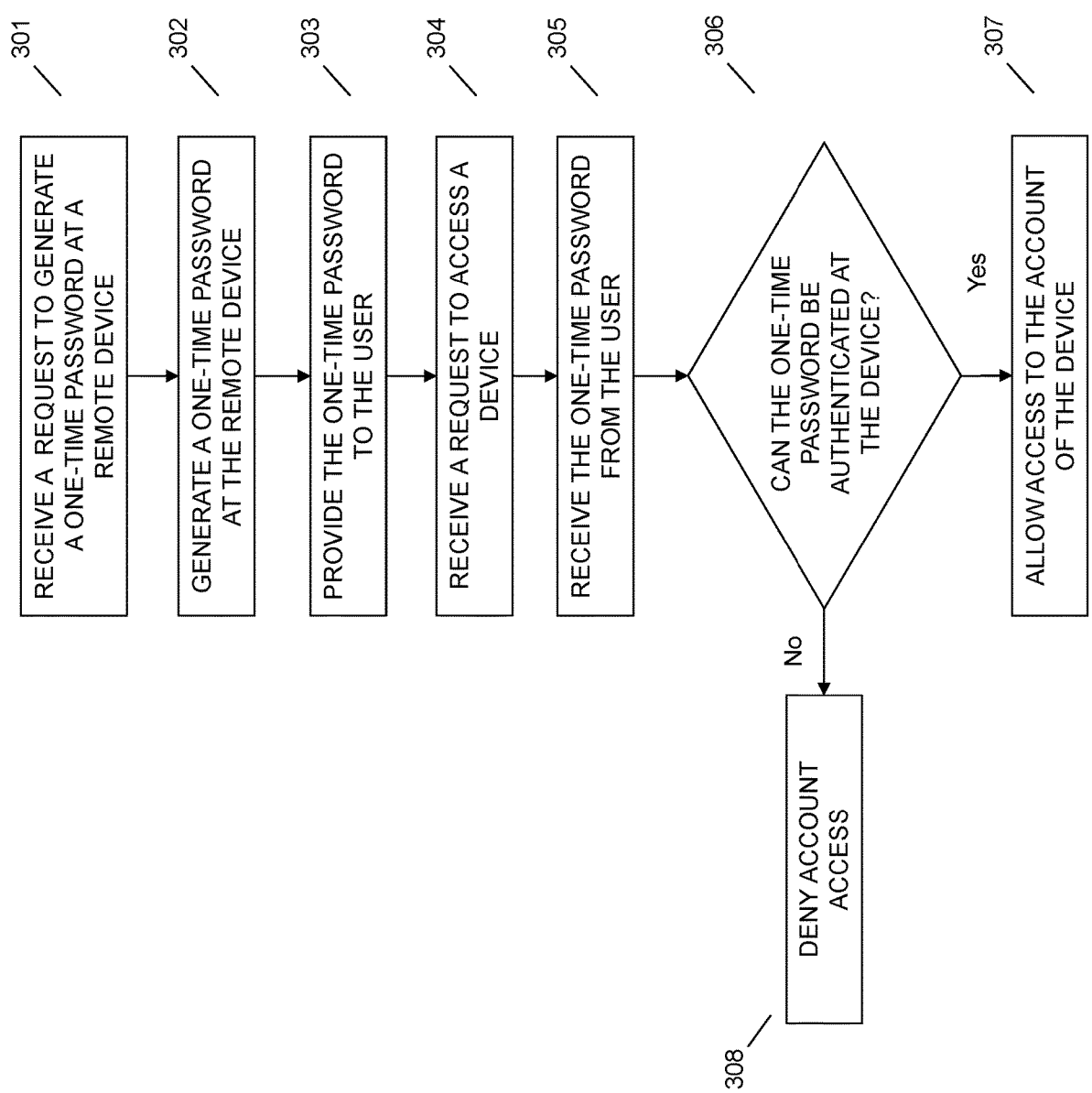
FIG. 3 illustrates an example method of authenticating a default account of a device utilizing a one-time password generated at a remote device.

Referring now to FIG. 3, an embodiment may authenticate a default account of a device utilizing a one-time password generated at a remote device. A user may wish to log into a default account of a device. For example, the user may want to log into an administrator default account of a device. The default account may require a password. Accordingly, at 301, the user may provide, and, therefore, the remote device may receive, a request to generate a one-time password to access the default account of the device. The remote device may include a cloud server, network server, or any other device that is not the device having the default account that the user is attempting to access. When accessing the remote device, the user may first be required to provide authentication information at the remote device, for example, the user may need to log into an account that has been previously setup at the remote device and associated with the user. Upon successful authentication, the remote device may allow access to an application that can generate the requested one-time password.

When setting up the account at the remote device, the user may need to provide identifying information of the user and also identifying information for any devices that have default accounts that the user may want to access. Thus, not only does the remote device have information related to user attributes, the remote device also has information related to the identity of the device and default accounts of the device. Alternatively, the information related to the device and default account of the device can be provided by the user when the user accesses the remote device, for example, by providing a device serial number, selecting a device model from a list, having devices linked to the credentials of the user, or otherwise providing a device identifier. Having user attributes provides another level of security with regard to the generation of the one-time password.

When the devices are manufactured, each device is preconfigured or programmed and associated with a public/private key pair, for example, an elliptic curve cryptography (ECC) key pair. While the example of an ECC key pair is used here and throughout for ease of readability, it should be understood that any type of asymmetric cryptography can be utilized. The public/private key pair for the device will be referred to as the device public key and the device private key or device public/private key pair to distinguish them from the public/private key pair corresponding to each of the default accounts. The device public key is exported from the device to and stored on the remote device. Once exported, the device no longer has to maintain a copy of the device public key. However, the device may continue to maintain a copy of the device public key.

Additionally, at the time of manufacture, each default account of the device is configured with and represented by a public/private key pair, referred to herein as the account public key and account private key or account public/private key pair. For clarification, each default account of the device has its own corresponding account public/private key pair. The account private/public key pairs are generated on the remote device and the account public keys are exported to the device during manufacturing. The account private keys remain securely stored on the remote device. It should be understood that while one remote device is referred to herein, there may be multiple remote devices. For example, different keys for different accounts or devices may be exported and stored on different remote devices. As another example, the keys may be stored within a database or other storage location that each of the multiple remote devices have access to in order to access the different keys. Alternatively, although not as secure, the same keys may be exported and stored on multiple remote devices.

Since many devices have the same default accounts, the default accounts across multiple devices may all be represented by the same public/private key pair. Thus, the account keys that are distributed to the devices may all be the same keys and the account keys that are exported to the remote device may work with the default accounts across multiple devices. Alternatively, each default account on each device may have a unique corresponding account key pair.

At 302, the remote device may generate a one-time password utilizing the account private key corresponding to the default account that the user is attempting to access and a device public key corresponding to the device that the user is attempting to access. Since the remote device has many different keys for different devices and default accounts, the remote device has to determine which device and account the keys are needed for. Accordingly, the remote device identifies the device and default account, either requesting input from the user to identify the device and/or account or via the profile of the user who accessed the remote device if the profile has devices/accounts associated with it. For example, if the user identifies the device and/or default account when the user logs into the remote device, the system can identify the keys corresponding to the device and the default account. As another example, if the user is already associated with a device and/or default account within the remote device, the remote device may use this information to use the correct keys that correspond to the device and default account.

Once the remote device has determined which device and default account, and, therefore, which device public key and account private key, to utilize, the remote device generates a one-time password using the device public key and account private key. The remote device may also use other information in generating the one-time password, for example, timestamp information, a counter, or the like. In generating the one-time password the remote device may use one or more one-time password generation algorithms. For example, the remote device may use an Elliptic Curve Diffie-Hellman (ECDH) key agreement algorithm to generate the key used to generate a time based one-time password (TOTP), hash based one-time password (HOTP), or any other key based one-time password generation algorithm. As stated above, any asymmetric key agreement algorithm can be used and the above are merely examples. The remote device may also use a combination of algorithms, for example, the system may use the ECDH key agreement algorithm with the TOTP algorithm. The algorithm that is utilized may dictate some of the information that is utilized by the remote device in generating the one-time password. For example, utilizing a TOTP algorithm may include utilizing a timestamp within the one-time password generation. An example function for generating the one-time password is Base64(SHA256(ECDH(Default Account Private Key, Device Public Key), timestamp or counter).

At 303 the one-time password generated by the remote device is provided to the user. This one-time password will be referred to as one-time password or remote one-time password to distinguish it from the one-time password generated by the device as discussed further herein. At this point, the remote device no longer needs to retain the one-time password, so the one-time password is not stored on the remote device. Additionally, the role of the remote device is complete with regard to this transaction.

The user then accesses the device and the default account of the device. Thus, the device receives a request from the user to access a default account of the device at 304. The device presents the user with a log-in screen, application, or the like, requesting the user provide credentials for logging into or otherwise accessing the default account. At this point the user can provide the default account's username, which may be a default username or may even be prepopulated, and the one-time password into the credential request. Thus, the device receives the one-time password that was generated by the remote device at 305. As stated above, the one-time password was generated using the account private key corresponding to the default account and the device public key corresponding to the device, both of these keys being stored on the remote device.

At 306 the device determines whether the remote one-time password can be authenticated. To authenticate the remote one-time password, the device generates a device one-time password. To generate the device one-time password, the device can utilize any of the one-time password generation algorithms mentioned above with respect to the remote device. However, whatever one-time password generation algorithm is used must match the one-time password generation algorithm that is used by the remote device. In other words, if the remote device used an ECDH key agreement algorithm in conjunction with a TOTP algorithm, the device must also use an ECDH key agreement algorithm in conjunction with a TOTP algorithm to generate the device one-time password. Additionally, any extra information that is utilized by the remote device in generating the one-time password, for example, a timestamp or counter, must also be utilized by the device in generating the device one-time password.

The difference in generating the device one-time password is that the device utilizes the device private key and the account public key stored on the device, which are the corresponding keys that were used by the remote device in generating the remote one-time password. Thus, an example function that corresponds to the example function of the remote device that may be utilized by the device in generating the device one-time password is Base64(SHA256 (ECDH(Device Private Key, Default Account Public Key), timestamp or counter). Due to the properties of the algorithms, the remote one-time password and the device one-time password will match. Accordingly, in authenticating the remote one-time password, the system simply compares the remote one-time password provided by the user at 305 with the generated device one-time password. Since the passwords simply need to be compared, the passwords do not need to be stored on the device, thus, once the system has compared the passwords, the passwords can be deleted or removed from the device.

Upon an unsuccessful authentication, for example, the remote one-time password and the device one-time password do not match, the system may deny account access at 308. The system may also provide the user with the opportunity to re-enter the remote one-time password or have a new password generated. On the other hand, upon a successful authentication, for example, the remote one-time password and the device one-time password match, the system may grant the user access to the account at 307. Even though the system utilizes a remote device, the device itself does not need to be connected to or communicate with the remote device. Rather, the user accesses the remote device, provides and obtains the necessary information, and then provides the remote one-time password to the device without the device communicating with the remote device at all.

In other words, utilizing the device public/private key pair and the account public/private key pair, the remote device and the device can work separately, without communicating with each other at all, to provide the authentication credentials to the user and authenticate the credentials provided by the user.

Thus, the described system and method provide a technical improvement over current default account authentication methods by providing a more robust authentication system that generates a one-time password for default accounts on a device. Rather than simply utilizing generic passwords or passwords that are included on the device or with literature included with the device which can be insecure, the described system generates a one-time password whenever a user wants to log into a default account on a device. By utilizing public/private key pairs, the password can be generated on a remote device and then authenticated by the local device, thereby allowing a more secure and user-friendly solution that does not require a user to either remember a password for the device or find the password on the device and manually provide it to the device. Additionally, since the password generation is tied to the device, the default account, and the user attempting to access the default account, the ability of an attacker to access the device is greatly reduced. Thus, the described system is more secure, more user-friendly, and less time intensive than conventional systems for providing credentials for default accounts on a device.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at a remote device and from a user, a request to generate a one-time password for accessing a default account of a device, wherein the remote device comprises a device public key corresponding to the device and an account public/private key pair corresponding to the default account;
   generating, at the remote device, the one-time password utilizing the account private key and the device public key; and
   providing, from the remote device, the one-time password to the user.

2. The method of claim 1, wherein the receiving a request comprises receiving user credentials associated with the remote device and authenticating the user at the remote device.

3. The method of claim 1, wherein the generating the one-time password utilizes a timestamp.

4. The method of claim 1, wherein the remote device stores device public keys for a plurality of devices.

5. The method of claim 1, wherein the receiving a request comprises receiving an identification of the device; and
   wherein the device public key utilized in the generating comprises a public key corresponding to the identified device.

6. The method of claim 1, wherein the receiving a request comprises receiving an identification of the default account; and
   wherein the account private key utilized in the generating comprises a private key corresponding to the identified default account.

7. The method of claim 1, wherein each of the device public key and the account private key comprise elliptic curve cryptography keys.

8. The method of claim 1, wherein the device public key is exported to the remote device during manufacture of the device.

9. The method of claim 1, wherein the generating the one-time password comprises utilizing at least one one-time password algorithm selected from the group consisting of: Elliptic Curve Diffie-Hellman key agreement algorithm, time based one-time password algorithm, and hash based one-time password algorithm.

10. The method of claim 1, wherein the one-time password is not stored on either the remote device or the device.

11. An information handling device, comprising:
    a processor;
    a memory device that stores instructions executable by the processor to:
    receive, at a remote device and from a user, a request to generate a one-time password for accessing a default account of a device, wherein the remote device comprises a device public key corresponding to the device and an account public/private key pair corresponding to the default account;
    generate, at the remote device, the one-time password utilizing the account private key and the device public key; and
    provide, from the remote device, the one-time password to the user.

12. The information handling device of claim 11, wherein the instructions to receive a request comprise instructions to receive user credentials associated with the remote device and authenticating the user at the remote device.

13. The information handling device of claim 11, wherein the instructions to generate the one-time password utilizes a timestamp.

14. The information handling device of claim 11, wherein the remote device stores device public keys for a plurality of devices;
    wherein the receiving a request comprises receiving an identification of the device; and
    wherein the device public key utilized in the generating comprises a public key corresponding to the identified device.

15. The information handling device of claim 11, wherein the instructions to receive a request comprises instructions to receive an identification of the default account; and
    wherein the account private key utilized in the generating comprises a private key corresponding to the identified default account.

16. The information handling device of claim 11, wherein each of the device public key and the account private key comprise elliptic curve cryptography keys.

17. The information handling device of claim 11, wherein the device public key is exported to the remote device during manufacture of the device.

18. The information handling device of claim 11, wherein the instructions to generate the one-time password comprises utilizing at least one one-time password algorithm selected from the group consisting of: Elliptic Curve Diffie- Hellman key agreement algorithm, time based one-time password algorithm, and hash based one-time password algorithm.

19. The information handling device of claim 11, wherein the one-time password is not stored on either the remote device or the device.

20. A product, comprising:
- a storage device that stores code, the code being executable by a processor and comprising:
- code that receives, at a remote device and from a user, a request to generate a one-time password for accessing a default account of a device, wherein the remote device comprises a device public key corresponding to the device and an account public/private key pair corresponding to the default account;
- code that generates, at the remote device, the one-time password utilizing the account private key and the device public key; and
- code that provides, from the remote device, the one-time password to the user.

* * * * *